US012449755B2

(12) United States Patent
Shibuya

(10) Patent No.: US 12,449,755 B2
(45) Date of Patent: Oct. 21, 2025

(54) PRINTING SYSTEM, PRINTING SYSTEM CONTROL METHOD, AND STORAGE MEDIUM

(71) Applicant: CANON KABUSHIKI KAISHA, Tokyo (JP)

(72) Inventor: Yuichiro Shibuya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/590,751

(22) Filed: Feb. 28, 2024

(65) Prior Publication Data

US 2024/0295850 A1 Sep. 5, 2024

(30) Foreign Application Priority Data

Mar. 1, 2023 (JP) ................................ 2023-031381

(51) Int. Cl.
*G03G 21/06* (2006.01)
*G03G 15/00* (2006.01)

(52) U.S. Cl.
CPC ......... *G03G 21/06* (2013.01); *G03G 15/5016* (2013.01); *G03G 2221/0005* (2013.01)

(58) Field of Classification Search
CPC ........... G03G 15/6573; G03G 15/6552; B65H 2301/5133
See application file for complete search history.

(56) References Cited

U.S. PATENT DOCUMENTS

2017/0277098 A1* 9/2017 Yamaoka ........... G03G 15/6511
2021/0216027 A1* 7/2021 Tanaka ............... G03G 15/6573
2022/0126601 A1* 4/2022 Mutsuno ............ G03G 15/5062

FOREIGN PATENT DOCUMENTS

JP H11258881 A 9/1999

* cited by examiner

*Primary Examiner* — Jessica L Eley
(74) *Attorney, Agent, or Firm* — Canon U.S.A., Inc. IP Division

(57) ABSTRACT

If a sheet type has been changed without changing the charge-elimination charge adjustment value, a charge elimination control may be performed on sheets with a charge adjustment value inappropriate for the sheets, which may result in charging the sheets and lead to further sticking of the sheets. A control method for printing system, that includes a charge elimination unit that performs a charge elimination process on a sheet, includes performing a printing process, performing, in a case where a sheet type to be used for the printing process has been changed during the printing process, control to stop the printing process, and changing a setting of charge elimination that is performed by the charge elimination unit.

7 Claims, 14 Drawing Sheets

FIG.14

| SHEET TYPE | CHARGE ADJUSTMENT VALUE FOR CHARGE ELIMINATION |
|---|---|
| PLAIN PAPER | +5 |
| COATED PAPER/FILM | +15 |
| SYNTHETIC PAPER | +20 |

PRINTING SYSTEM, PRINTING SYSTEM CONTROL METHOD, AND STORAGE MEDIUM

BACKGROUND

Field of the Disclosure

The present disclosure relates to a printing system, a printing system control method, and a storage medium.

Description of the Related Art

Recording media (hereinafter, referred to as "sheets") used in a printing operation are sometimes conveyed in a state in which the sheets are charged with static electricity due to the residual charges produced in an electrophotographic process or due to slight friction with a conveyance roller or a guide during sheet conveyance. This static electricity may cause the sheets to stick to one another. This static electricity may further cause dust or paper powder to stick to printed products, which results in a deterioration of the quality of products.

On a sheet such as plain paper, electric charges are quickly dissipated because electrical resistance of the sheet is low due to which the electric charges easily move within the sheet, and furthermore, the charge quantity is small. In a case of a sheet, such as thick paper, synthetic paper, or coated paper, including synthetic resin (plastic), the sheet itself has a high electrical resistance. Consequently, the electric charges do not easily move within the sheet, which means that the sheets such as synthetic paper and coated paper are more likely to be charged and tend to have residual charges. It is generally known that such types of sheets are easily affected by the environment, particularly by humidity, and are charged more easily with static electricity because less electricity is discharged into the air in the environment with a lower humidity.

If post-processing is performed on the sheets that are stuck to one another, the sheet alignment process is affected. This results in not only a deterioration of the quality of the post-processing but also occurrence of jamming due to a failure in paper feeding and conveyance in the post-processing, which may damage the sheets and devices.

To prevent the above-described risks, it is desirable that the static electricity remaining on the sheets should be eliminated between the printing process and the post-processing. For example, Japanese Patent Application Laid-Open No. H11-258881 discusses a technique for dissipating the electric charges on a sheet by applying a voltage to a pair of conveyance rollers disposed downstream in the sheet conveyance direction.

In the charge elimination process based on the conventional configuration, as described above, in which a voltage is applied to the conveyance rollers (hereinafter, referred to as charge elimination rollers), the static electricity on a sheet is dissipated by application of electric charges opposite to the electric charges on the sheet to the sheet via the charge elimination rollers. This configuration requires that the quantity of charges, which is to be applied from the charge elimination rollers (application of the charges opposite to those on the sheet to the charge elimination rollers), is set in accordance with the quantity of charges on the sheet. This means that an optimum charge adjustment value for charge elimination varies with printing environments, such as humidity and a sheet type.

If the sheet type has been changed without changing the charge-elimination charge adjustment value, the charge elimination control operation is performed on a sheet with the charge adjustment value, which may be inappropriate for the sheet. In this case, the sheets may be charged oppositely and may be further stuck to one another.

SUMMARY

According to an aspect of the present disclosure, a printing system includes a charge elimination unit that performs a charge elimination process on a sheet; a printer unit configured to perform a printing process; a control unit configured to perform, in a case where a sheet type to be used for the printing process has been changed during the printing process, control to stop the printing process; and an operation unit configured to change a setting of charge elimination that is performed by the charge elimination unit.

Further features of various embodiments of the present disclosure will become apparent from the following description of exemplary embodiments with reference to the attached drawings.

BRIEF DESCRIPTION OF THE DRAWINGS

FIG. 14 is a diagram illustrating an example of a charge adjustment value table according to the second exemplary embodiment.

DESCRIPTION OF THE EMBODIMENTS

Hereinafter, exemplary embodiments of the present disclosure will be described with reference to the drawings.

The following exemplary embodiments do not limit every embodiment or the claims, and not all combinations of features described in the exemplary embodiments are essential as the means for solving the problem.

<Overall Configuration of System>

Figure 1:
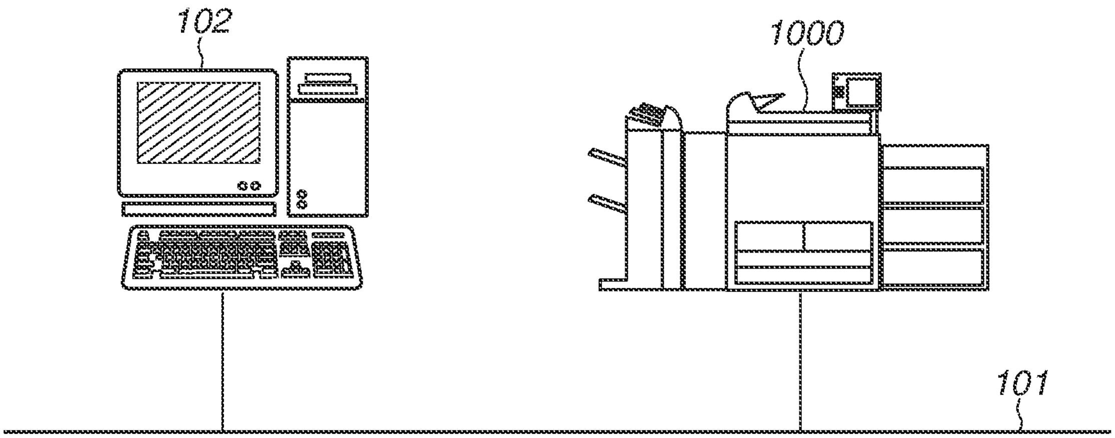
FIG. 1 is a diagram illustrating an example of an overall configuration of a system according to exemplary embodiments.

FIG. 1 is a diagram illustrating an example of an overall configuration of a system according to exemplary embodiments of the present disclosure.

The system according to the present exemplary embodiments includes a printing system 1000 and a client computer 102 (hereinafter, referred to as a PC 102), which are connected to each other via a network 101.

The PC 102 sends page description language (PDL) code data, which is a print job, to the printing system 1000 via the network 101.

<Hardware Configuration of Printing System 1000>

Figure 2:
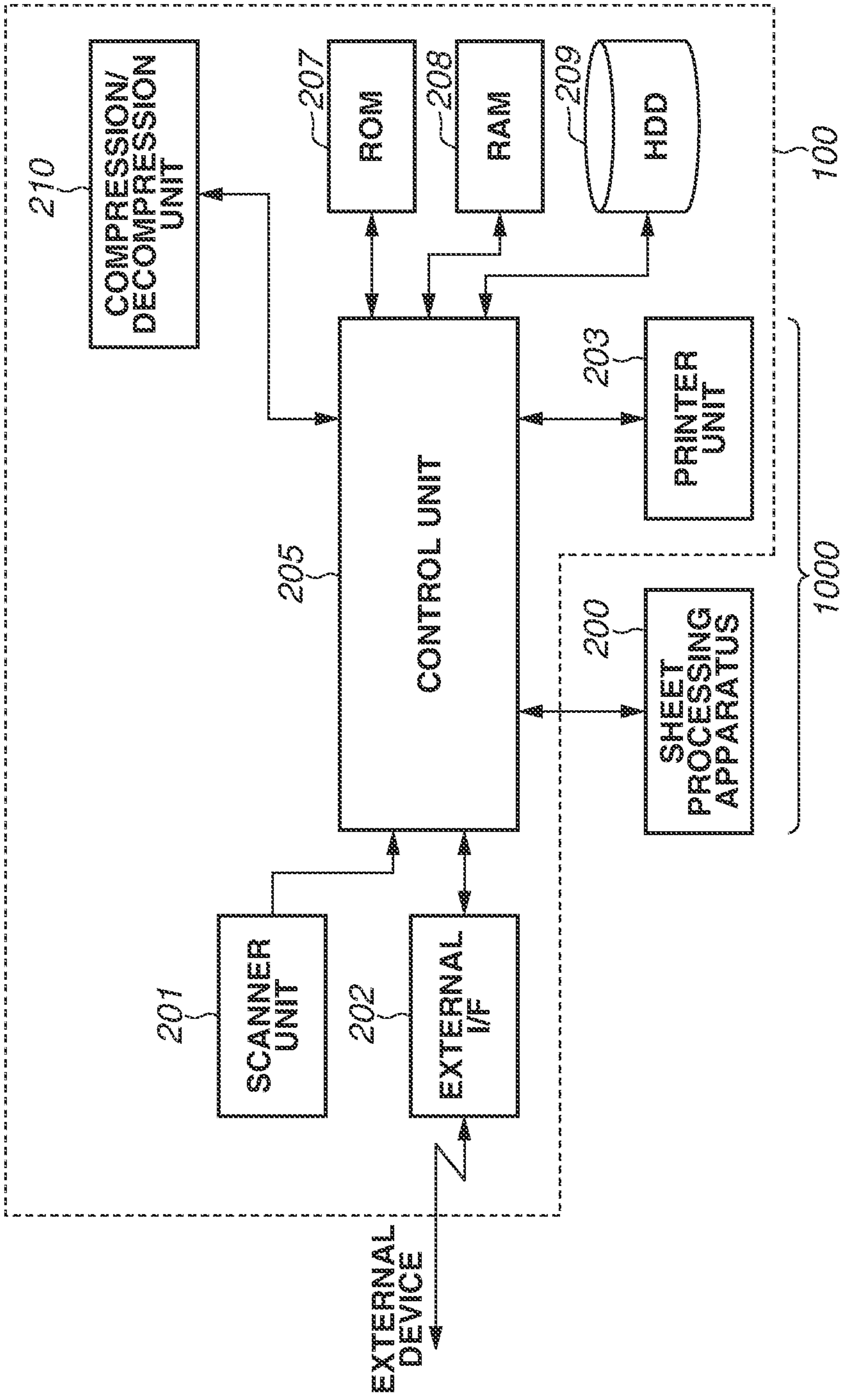
FIG. 2 is a block diagram illustrating an example of a hardware configuration of a printing system according to the present exemplary embodiments.

FIG. 2 is a block diagram illustrating an example of a hardware configuration of the printing system 1000.

The printing system 1000 includes a printing apparatus 100, which is a portion surrounded by a dotted line in FIG. 2, and a sheet processing apparatus 200. Any number of sheet processing apparatuses 200 can be connected to the printing apparatus 100. In the present exemplary embodiment, a multi-function peripheral (MFP) having a plurality of functions, such as a copy function and a printer function, will be described as an example of the printing apparatus 100. Alternatively, the printing apparatus 100 may be a single-function printing apparatus having only a copy function or a printer function. In the present exemplary embodiment, as an example, the printing system 1000 includes various kinds of configuration requirements described below.

In the printing system 1000, the sheet processing apparatus 200 connected to the printing apparatus 100 performs sheet processing on a sheet (also referred to as "paper") printed by the printing apparatus 100. Alternatively, the printing system 1000 can be configured only with the printing apparatus 100 without the sheet processing apparatus 200 being connected thereto.

The sheet processing apparatus 200 communicates with the printing apparatus 100 and performs sheet processing, which will be described below, in response to receiving an instruction from the printing apparatus 100.

A scanner unit 201 reads an image on a document, converts the image into image data, and transfers the image data to another unit.

An external interface (I/F) 202 exchanges data with an external device connected to the network 101.

A printer unit 203 prints an image based on the received image data on a sheet.

Figure 4:
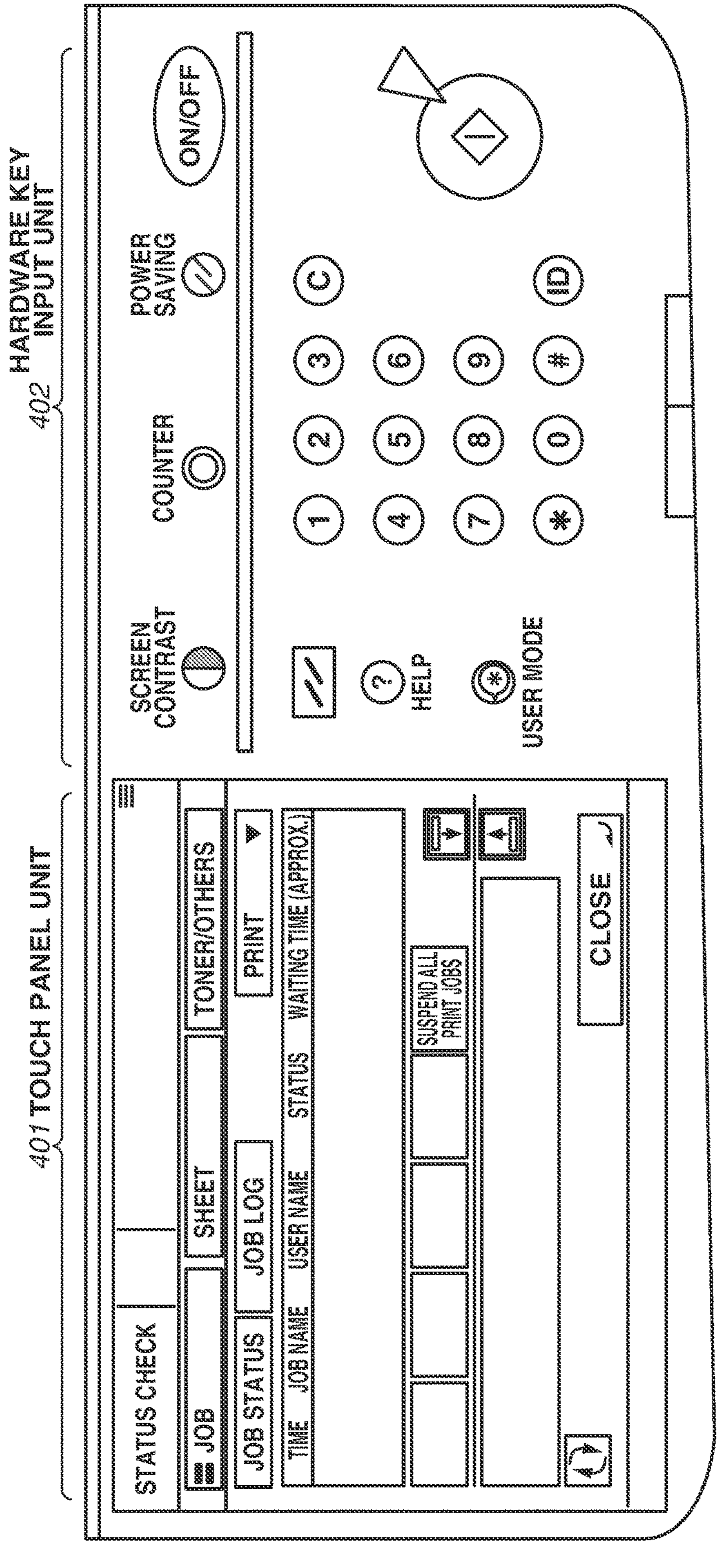
FIG. 4 is a diagram illustrating an example of an operation unit of a printing apparatus included in the printing system according to the present exemplary embodiments.

An operation unit includes a touch panel unit 401 and a hardware key input unit 402 as illustrated in FIG. 4 and receives instructions from a user via these units. The operation unit displays various kinds of information on the touch panel unit 401.

A control unit 205 includes a central processing unit (CPU) and comprehensively controls, for example, processing and operations of various kinds of units included in the printing system 1000. That is, the control unit 205 controls the operations of the printing apparatus 100 and the sheet processing apparatus 200 connected to the printing apparatus 100.

A read-only memory (ROM) 207 stores various kinds of computer programs executed by the control unit 205. For example, the ROM 207 stores programs for causing the control unit 205 to perform various kinds of processes described with the flowcharts, which will be described below, and a display control program for displaying various kinds of setting screens, which will be described below. The ROM 207 stores a program with which the control unit 205 interprets the PDL code data received from the PC 102 and rasterizes the PDL code data into raster image data. In addition, the ROM 207 stores a boot sequence, font information, etc.

A random access memory (RAM) 208 stores image data and PDL code data sent from the scanner unit 201 and the external I/F 202, various kinds of programs loaded from the ROM 207, and setting information. The RAM 208 stores information about the sheet processing apparatus 200 (for example, information about the type and function of the individual sheet processing apparatus 200 connected to the printing apparatus 100). The control unit 205 can use the information about the sheet processing apparatus 200 stored in the RAM 208 to control operations.

A hard disk drive (HDD) 209 includes a hard disk, a drive unit that reads and writes data on the hard disk, and the like. The HDD 209 is a large-capacity storage device for storing image data received from the scanner unit 201 and compressed by a compression/decompression unit 210. The control unit 205 prints the image data stored in the HDD 209 by using the printer unit 203, based on an instruction from the user. The HDD 209 is also used as a spooler, and the control unit 205 manages the PDL code data received from the PC 102 as a print job and stores the print job in the HDD 209. The control unit 205 manages the print jobs stored in the HDD 209 and acquires the number of stored print jobs and information about settings of the print jobs. Instead of or in combination with the HDD, a different storage device, such as a solid state drive (SSD) or an embedded MultiMediaCard (eMMC), may be included in the configuration.

The compression/decompression unit 210 performs compression/decompression operations on the image data and the like stored in the RAM 208 or the HDD 209 by using various kinds of compression methods, such as Joint Bi-level Image Experts Group (JBIG) or Joint Photographic Experts Group (JPEG).

As will be described in detail below, the printing system 1000 according to the present exemplary embodiment is a printing system including a charge elimination apparatus having a charge elimination function, settings of which are changeable during a printing process.

Figure 3:
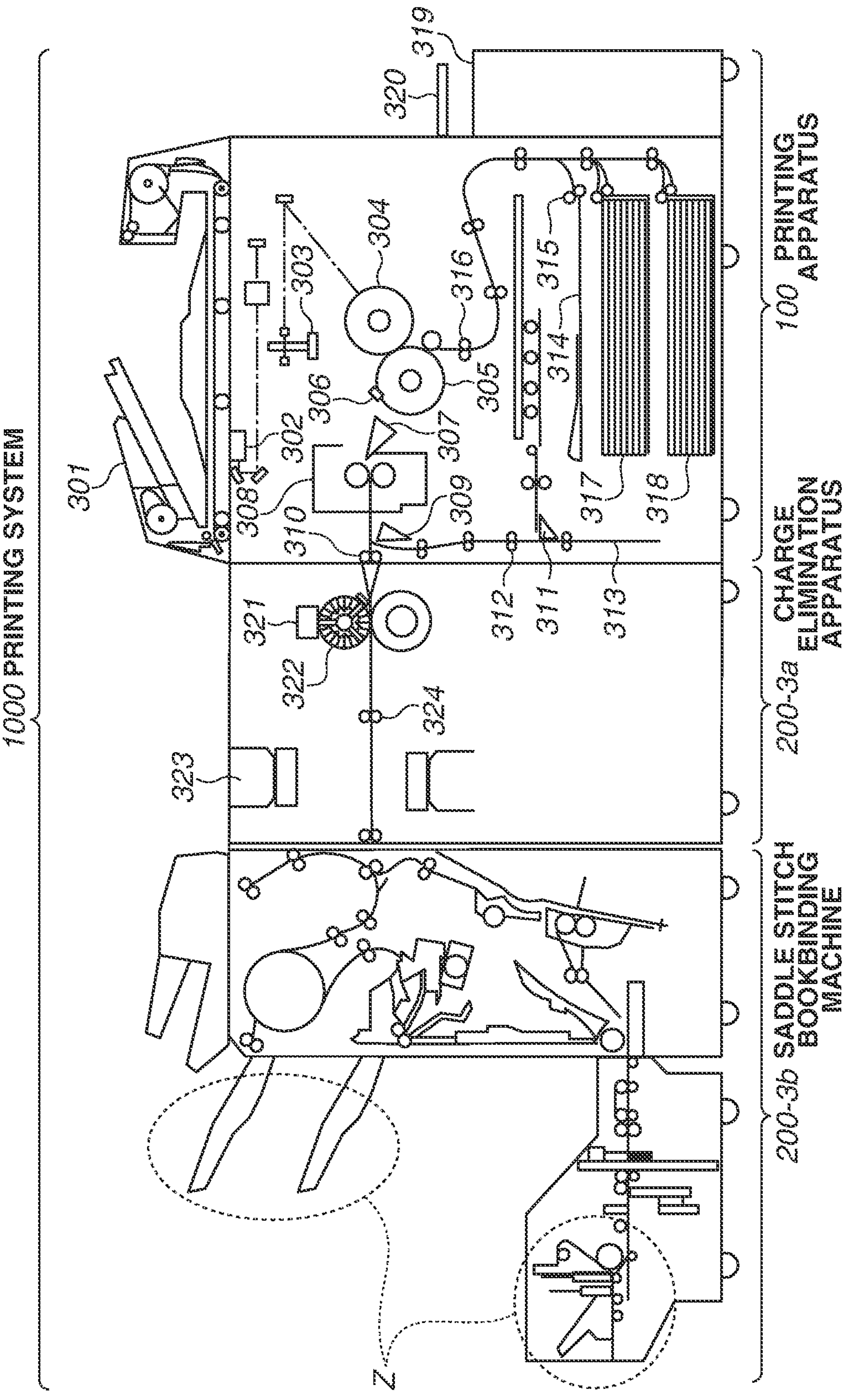
FIG. 3 is a diagram illustrating an example of a cross section of the printing system according to a first exemplary embodiment.

FIG. 3 is a diagram illustrating an example of a cross section of the printing apparatus 100 and the sheet processing apparatus 200 connected to the printing apparatus 100 according to a first exemplary embodiment.

The sheet processing apparatus 200 according to the present exemplary embodiment includes a charge elimination apparatus 200-3*a* and a saddle stitch bookbinding machine 200-3*b*.

First, the printing apparatus 100 will be described.

An automatic document feeder (ADF) 301 separates a bundle of documents set on a loading surface of a document tray in order of pages starting from the first page of the documents, and conveys each document onto a platen glass to scan the documents with a scanner 302.

The scanner 302 reads an image of the document conveyed onto the platen glass and converts the image into image data by using a charge-coupled device (CCD).

A rotary polygonal mirror (a polygon mirror or the like) 303 receives a light beam, such as a laser beam modulated based on the image data, and irradiates a photosensitive drum 304 with the light beam as scanning light reflected from a reflection mirror.

A latent image formed on the photosensitive drum 304 by the laser beam is developed with toner, and the resultant toner image is transferred to the sheet material attached to a transfer drum 305. A full-color image is formed by sequentially performing this image forming process for the toners of yellow (Y), magenta (M), cyan (C), and black (K). After the four image forming processes have been performed, the sheet material having the full-color image on the transfer drum 305 is separated by a separation claw 306 and is conveyed to a fixing device 308 by a pre-fixing conveyance device 307.

The fixing device 308 is configured by a combination of rollers and belts, includes a heat source, such as a halogen heater, and applies heat and pressure to fuse and fix the toner on the sheet material to which the toner image has been transferred.

A discharge flapper 309 is swingable about a swing shaft and defines a conveyance direction of the sheet material. When the discharge flapper 309 swings in the clockwise direction in FIG. 3, the sheet material is conveyed straightforward and discharged to the outside of the printing apparatus 100 by discharge rollers 310.

The control unit 205 controls the printing apparatus 100 such that one-sided printing is performed in accordance with the series of sequences described above.

In a case where images are formed on both sides of the sheet material, the discharge flapper 309 swings in the counterclockwise direction in FIG. 3 such that the sheet material changes its course to the downward direction and is sent to a two-sided printing conveyance unit. The two-sided printing conveyance unit includes a reverse flapper 311, reverse rollers 312, a reverse guide 313, and a two-sided print tray 314.

The reverse flapper 311 swings about a swing shaft and defines the conveyance direction of the sheet material. When processing a two-sided print job, the control unit 205 performs a control operation such that the reverse flapper 311 swings in the counterclockwise direction in FIG. 3 and sends the sheet having a first surface already printed by the printer unit 203 to the reverse guide 313 via the reverse rollers 312. When the rear end of the sheet material is nipped by the reverse rollers 312, the reverse rollers 312 are temporarily stopped. Next, the reverse flapper 311 is swung in the clockwise direction in FIG. 3, and the reverse rollers 312 are rotated in the reverse direction. As a result, the conveyance direction of the sheet is switched, and the sheet is conveyed with the rear end and the front end of the sheet being switched, being guided to the two-sided print tray 314. The sheet material is temporarily stacked on the two-sided print tray 314 and then sent to registration rollers 316 again by re-feeding rollers 315. At this point, a surface of the sheet material which is opposite to the first surface processed in the transfer process faces the photosensitive drum. Next, an image is formed on a second surface of the sheet in the same manner as the process described above. The images are formed on both sides of the sheet material, and after a fixing process is performed, the sheet is discharged from the inside of the main body of the printing apparatus 100 to the outside via the discharge rollers 310. The control unit 205 controls the printing apparatus 100 such that the two-sided printing is performed in accordance with the series of sequences as described above.

The printing apparatus 100 includes paper feeding units that store sheets to be used for the printing process. Examples of the paper feeding units include paper feeding cassettes 317 and 318 (each stores 500 sheets, for example), a paper feeding deck 319 (stores 5,000 sheets, for example), and a manual feeding tray 320. Various kinds of sheets, which are different in size or material, are separately set in the paper feeding cassettes 317 and 318 and the paper feeding deck 319, which serve as the paper feeding units. Various types of sheets including special sheets, such as OHP sheets, can be set on the manual feeding tray 320.

<Charge Elimination Apparatus>

Next, the charge elimination apparatus 200-3*a* will be described.

Figure 5:
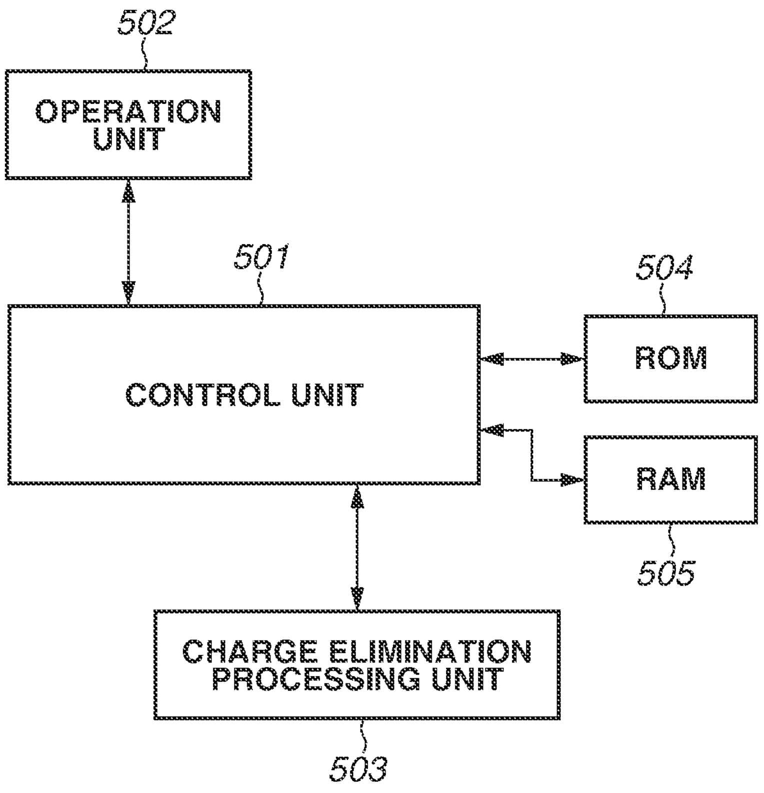
FIG. 5 is a block diagram illustrating an example of a configuration of a charge elimination apparatus included in the printing system according to the present exemplary embodiments.

FIG. 5 is a system block diagram illustrating an example of a configuration of the charge elimination apparatus 200-3*a*.

The charge elimination apparatus 200-3*a* also includes a control unit 501, separately from the control unit 205 of the printing apparatus 100. The control unit 501 comprehensively manages the entire charge elimination apparatus 200-3*a* while communicating with the control unit 205 of the printing apparatus 100 in FIG. 2 via a bus (not illustrated).

Figure 6:
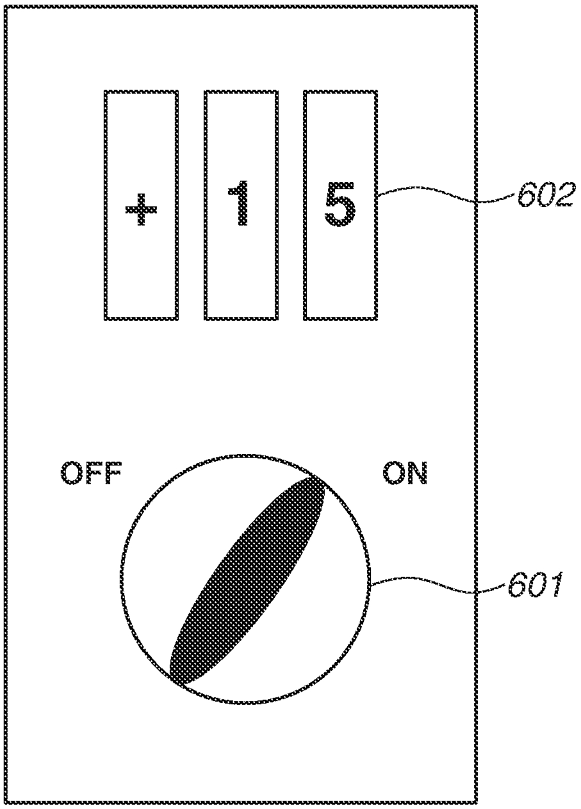
FIG. 6 is a diagram illustrating an example of an operation unit of the charge elimination apparatus included in the printing system according to the present exemplary embodiments.

An operation unit 502 has a configuration as illustrated in FIG. 6, and the user can change settings of the charge elimination apparatus 200-3*a* via the operation unit 502.

FIG. 6 is a diagram illustrating an example of the operation unit 502 of the charge elimination apparatus 200-3*a*.

A mode setting switch 601 in FIG. 6 is for switching between execution and non-execution (ON/OFF) of the charge elimination that is performed by the charge elimination apparatus 200-3*a*, and the control unit 501 performs a control operation such that a charge elimination processing unit 503 performs a charge elimination process, which will be described below, only when the mode setting switch 601 is ON.

An adjustment dial 602 including a thumbwheel switch is for adjusting the level of the charge elimination control operation that is performed when the mode setting switch 601 is ON. The charge elimination control operation is controlled and activated by the control unit 501 only when the mode setting switch 601 is ON.

As will be described below, the charge elimination processing unit 503 includes a charge elimination roller 322, an ionizer 323, and a voltage application controller 321 for each one of the charge elimination roller 322 and the ionizer 323. The charge elimination processing unit 503 is a section for the charge elimination process that is performed on a sheet conveyed to this section. The control unit 501 controls voltages each to be applied to the charge elimination roller 322 and the ionizer 323 via the voltage application controller 321.

A read-only memory (ROM) 504 stores a boot program of the charge elimination apparatus 200-3*a*, a control program of the operation unit 502, and a charge elimination processing program of the charge elimination processing unit 503, for example. The control unit 501 loads a needed program from the ROM 504 to a random access memory (RAM) 505 as appropriate and executes the program.

(Charge Elimination Process)

The charge elimination process performed by the charge elimination processing unit 503 will be described with reference to FIG. 7.

Figure 7:
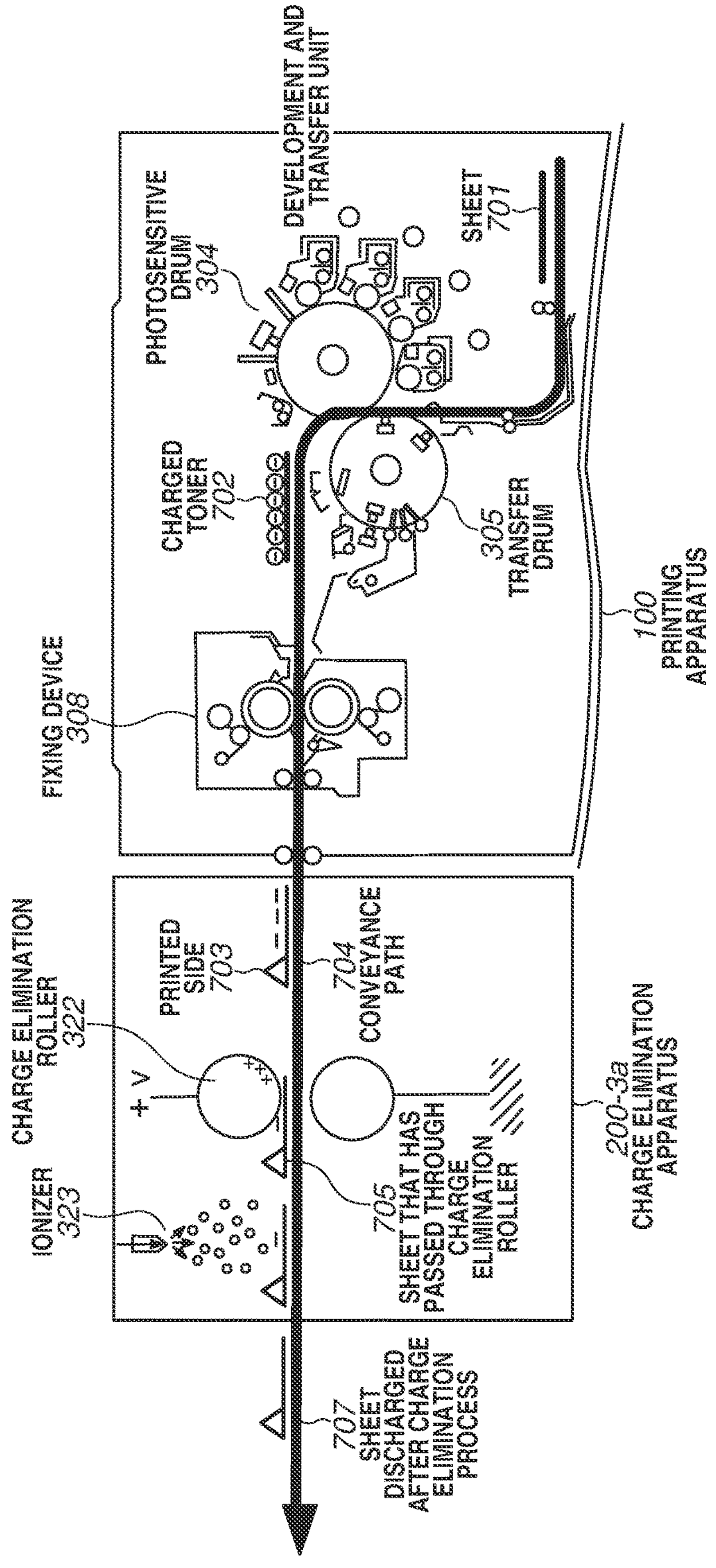
FIG. 7 is a schematic diagram illustrating a charge elimination process that is performed by the charge elimination apparatus included in the printing system according to the present exemplary embodiments.

FIG. 7 is a schematic diagram illustrating the charge elimination process that is performed by the charge elimination apparatus 200-3*a* on a sheet on which the printing process has been performed by the printing apparatus 100.

First, a sheet 701 is conveyed to a development and transfer unit including the photosensitive drum 304 and the transfer drum 305 via a conveyance path 704, and charged toner 702 is applied to the sheet 701. This charged toner 702 applied to the sheet 701 is negatively charged. Next, the sheet 701 passes through the fixing device 308 in which the charged toner 702 on the sheet 701 is fixed. The sheet 701 having a printed side 703 negatively charged is conveyed to the charge elimination apparatus 200-3*a*. The charge elimination apparatus 200-3*a* includes the positively-charged charge elimination roller 322 and dissipates the charges on the sheet 701 by bringing this charge elimination roller 322 into contact with the negatively-charged printed side 703. The charge elimination roller 322 applies positive charges to the printed side 703. Even after the charge elimination process using the charge elimination roller 322, some negative charges or some positive charges applied by the charge elimination roller 322 still remain on a sheet 705 that has passed through the charge elimination roller 322. Thus, the charge elimination apparatus 200-3*a* according to the present exemplary embodiment further includes the ionizer 323, which is disposed downstream of the charge elimination roller 322. The ionizer 323 is a device that generates corona discharge by applying a voltage to its internal electrode needle and dissipates the residual charges by using ions generated by the corona discharge. As described above, the charges are roughly eliminated by the charge elimination roller 322, and the residual charges are further dissipated by the ionizer 323. As a result, a sheet 707 discharged from the charge elimination apparatus 200-3*a* after the charge elimination process is not charged with electricity.

The following description will be given with reference to the sectional view in FIG. 3 again.

The charge elimination apparatus 200-3*a* includes the charge elimination roller 322 and a roller that is used in a pair with the charge elimination roller 322. The sheet is conveyed to the charge elimination apparatus 200-3*a* while being nipped between the two rollers, and the charge elimination by the charge elimination roller 322 is roughly performed as described above. The ionizer 323 performs the charge elimination process on the residual charges while the sheet is being conveyed toward the outside of the apparatus by conveyance rollers 324.

<Saddle Stitch Bookbinding Machine>

Next, the saddle stitch bookbinding machine 200-3*b* will be described.

Examples of the sheet processing by the saddle stitch bookbinding machine 200-3*b* include saddle stitch bookbinding, punching, cutting, shifted sheet discharging, folding, and stapling. These jobs are referred to as a saddle stitch bookbinding job.

In a saddle stitch bookbinding job, the control unit 205 performs control to convey the target sheets printed by the printing apparatus 100 to the saddle stitch bookbinding machine 200-3*b*, and performs the sheet processing of the saddle stitch bookbinding job in the saddle stitch bookbinding machine 200-3*b*. The control unit 205 performs control to hold the printed sheets of the saddle stitch bookbinding job, on which the sheet processing has been performed by the saddle stitch bookbinding machine 200-3*b*, at a discharge destination Z of the saddle stitch bookbinding machine 200-3*b*. The discharge destination Z includes a plurality of discharge destination options. The saddle stitch bookbinding machine 200-3*b* can perform a plurality of types of sheet processing, and an appropriate one of the plurality of discharge destination options is used for each type of sheet processing. In the present exemplary embodiment, a detailed description of the conveyance procedure for the individual saddle stitch bookbinding job will be omitted.

<Printing Process>

Figure 9:
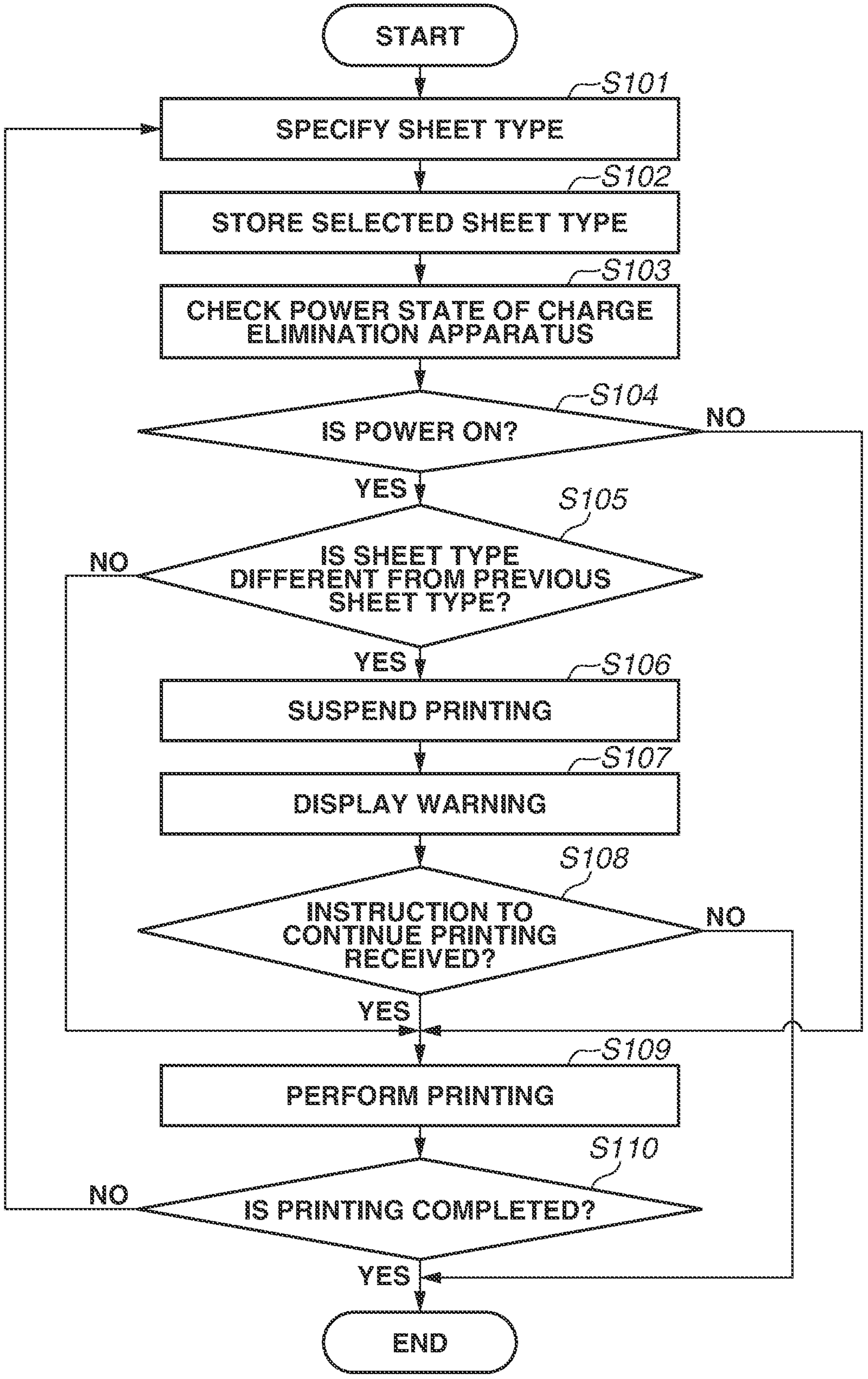
FIG. 9 is a flowchart illustrating a printing process according to the first exemplary embodiment.

FIG. 9 is a flowchart illustrating a printing process according to the first exemplary embodiment. The process described with this flowchart is realized by the control unit 205 loading a program stored in the ROM 207, the HDD 209, or the like to the RAM 208 and executing the program. This process starts when a print job is input to the printing system 1000.

In step S101, the control unit 205 of the printing apparatus 100 interprets the setting of the input print job and specifies the type of a sheet (also referred to as the sheet type) to be used for printing by selecting an optimal paper feeding unit.

Next, in step S102, the control unit 205 of the printing apparatus 100 stores the sheet type specified in step S101 in the HDD 209. At least the previously specified sheet type and the currently specified sheet type are stored such that these sheet types can be compared with each other. Any configuration may be used as long as the control unit 205 can detect a change in sheet type during the printing process.

Next, in step S103, the control unit 205 of the printing apparatus 100 acquires information indicating whether the charge elimination process by the charge elimination apparatus 200-3*a* is ON (the charge elimination function is enabled) or OFF (the charge elimination function is disabled). More specifically, the control unit 501 of the charge elimination apparatus 200-3*a* receives a query from the control unit 205 of the printing apparatus 100, acquires the state of the mode setting switch 601 of the operation unit 502 of the charge elimination apparatus 200-3*a*, and notifies the control unit 205 of the printing apparatus 100 of the acquired state.

Next, in step S104, the control unit 205 of the printing apparatus 100 checks the ON/OFF state of the power for the charge elimination process acquired in step S103. In a case where the power for the charge elimination process is OFF (NO in step S401), the control unit 205 of the printing apparatus 100 determines that there is no problem in continuing the printing process without any change because the charge elimination function is disabled, and the processing proceeds to step S109, which will be described below.

In a case where the power for the charge elimination process is ON (YES in step S401), the processing proceeds to step S105.

In step S105, the control unit 205 of the printing apparatus 100 compares the previously selected sheet type and the currently selected sheet type with each other, which are stored in the HDD 209 as described above, and checks whether the sheet types are different from each other. In a case where there is no previously selected sheet type stored, the control unit 205 determines that the previously selected sheet type is different from the currently selected sheet type.

In a case where the previously selected sheet type and the currently selected sheet type are the same (NO in step S105), the control unit 205 of the printing apparatus 100 determines that there is no problem in continuing the printing process without any change because the sheet type has not been changed during the printing process, and the processing proceeds to step S109.

In a case where the previously selected sheet type and the currently selected sheet type are different (YES in step S105), the control unit 205 of the printing apparatus 100 determines that the sheet type has been changed during the printing process, and the processing proceeds to step S106.

In step S106, the control unit 205 of the printing apparatus 100 suspends the printing process. The process in step S106 is to avoid a sheet that needs the charge elimination process being discharged without an appropriate charge elimination process or to avoid the sheet that does not need the charge elimination process being inappropriately subjected to the charge elimination process.

Figure 12:
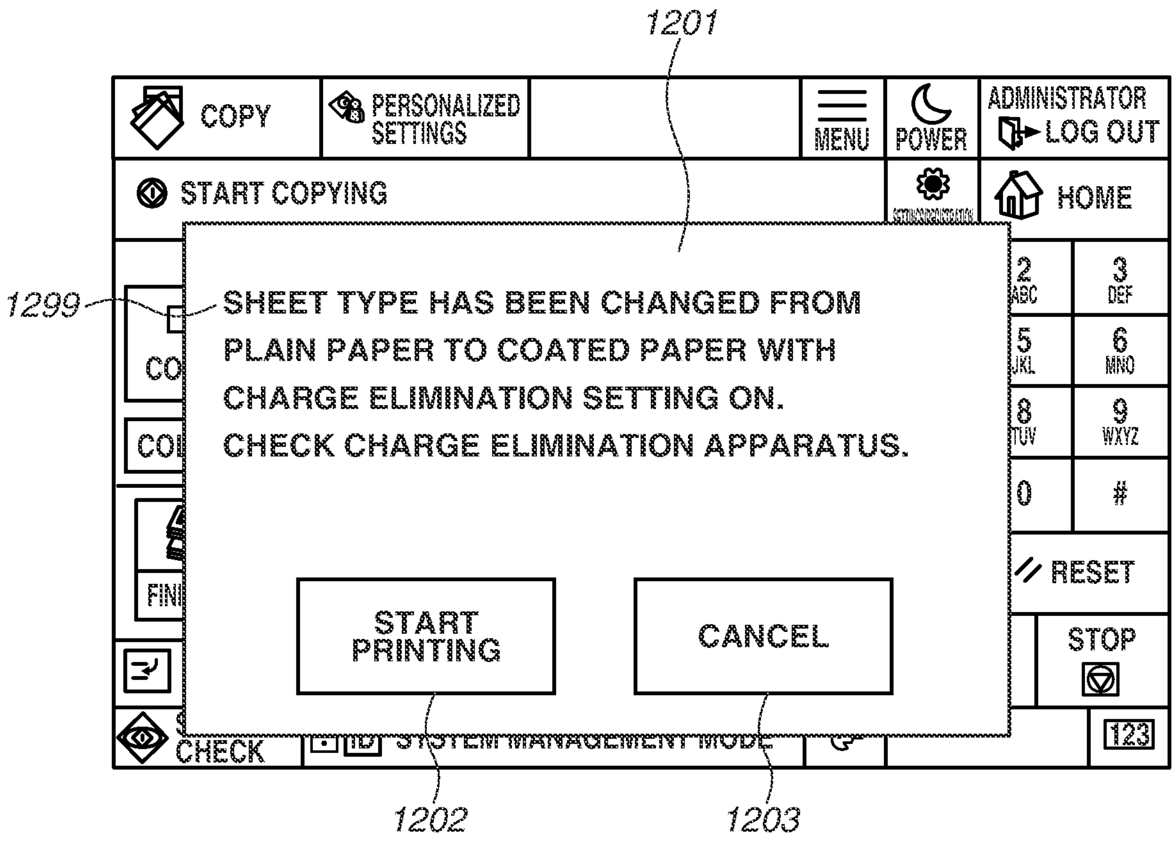
FIG. 12 is a diagram illustrating an example of a print start check screen according to the first exemplary embodiment.

Next, in step S107, the control unit 205 of the printing apparatus 100 displays a print start check screen 1201 as illustrated in FIG. 12 on the operation unit of the printing apparatus 100.

FIG. 12 illustrates an example of the print start check screen 1201 according to the first exemplary embodiment.

On the print start check screen 1201, the control unit 205 of the printing apparatus 100 notifies the user of a message 1299 prompting the user to check the charge elimination apparatus because the sheet type has been changed with the charge elimination setting being ON and asks the user whether to start printing. In a case where the user wishes to continue the printing after checking or in a case where the user instructs to continue the printing after changing the setting of the charge elimination apparatus, the user presses a print start button 1202. In a case where the user wishes to cancel the printing, the user presses a cancel button 1203. By using this screen, the printing system 1000 prompts the user to check whether the setting of the charge elimination apparatus matches the sheet type.

Next, in step S108, the control unit 205 of the printing apparatus 100 determines whether the print start button 1202 has been pressed on the print start check screen 1201 illustrated in FIG. 12. In a case where the control unit 205 of the printing apparatus 100 determines that the cancel button 1203 has been pressed (NO in step S108), the control unit 205 cancels the print job in accordance with the printing cancellation instruction and ends the process in the present flowchart.

In a case where the control unit 205 determines that the print start button 1202 has been pressed (YES in step S108), the processing proceeds to step S109.

In step S109, the control unit 205 of the printing apparatus 100 restarts the printing process in accordance with the printing start instruction and performs the print job.

Next, in step S110, the control unit 205 of the printing apparatus 100 determines whether the print job is completed. In a case where the print job is not yet completed (NO in step S110), the processing returns to step S101.

In a case where the print job is completed (YES in step S110), the control unit 205 of the printing apparatus 100 ends the process of the present flowchart.

By controlling the printing system 1000 including the charge elimination apparatus **200-3*a*** in the above-described way, occurrence of a situation in which charge elimination is performed on sheets with an inappropriate charge-elimination charge adjustment value that does not match the sheet type can be reduced. Thus, printing can be performed with a charge-elimination charge adjustment value that matches the sheet type. That is, this configuration leads to reduction in the risk of performing the charge elimination control operation with a charge adjustment value inappropriate for the sheet to be used for printing, which is an issue due to changing of the sheet type while the charge elimination apparatus is ON.

In the first exemplary embodiment, in a case where the current sheet type is different from the previous sheet type, the printing is suspended, and a warning to prompt the user to check the charge-elimination charge adjustment value is displayed. However, if the user is unfamiliar with the setting of the charge-elimination charge adjustment value, the user cannot easily determine whether the current charge-elimination charge adjustment value is correct. Thus, in a second exemplary embodiment, during the displaying of the warning, an optimum charge-elimination charge adjustment value that matches the selected sheet type is displayed.

Figure 10:
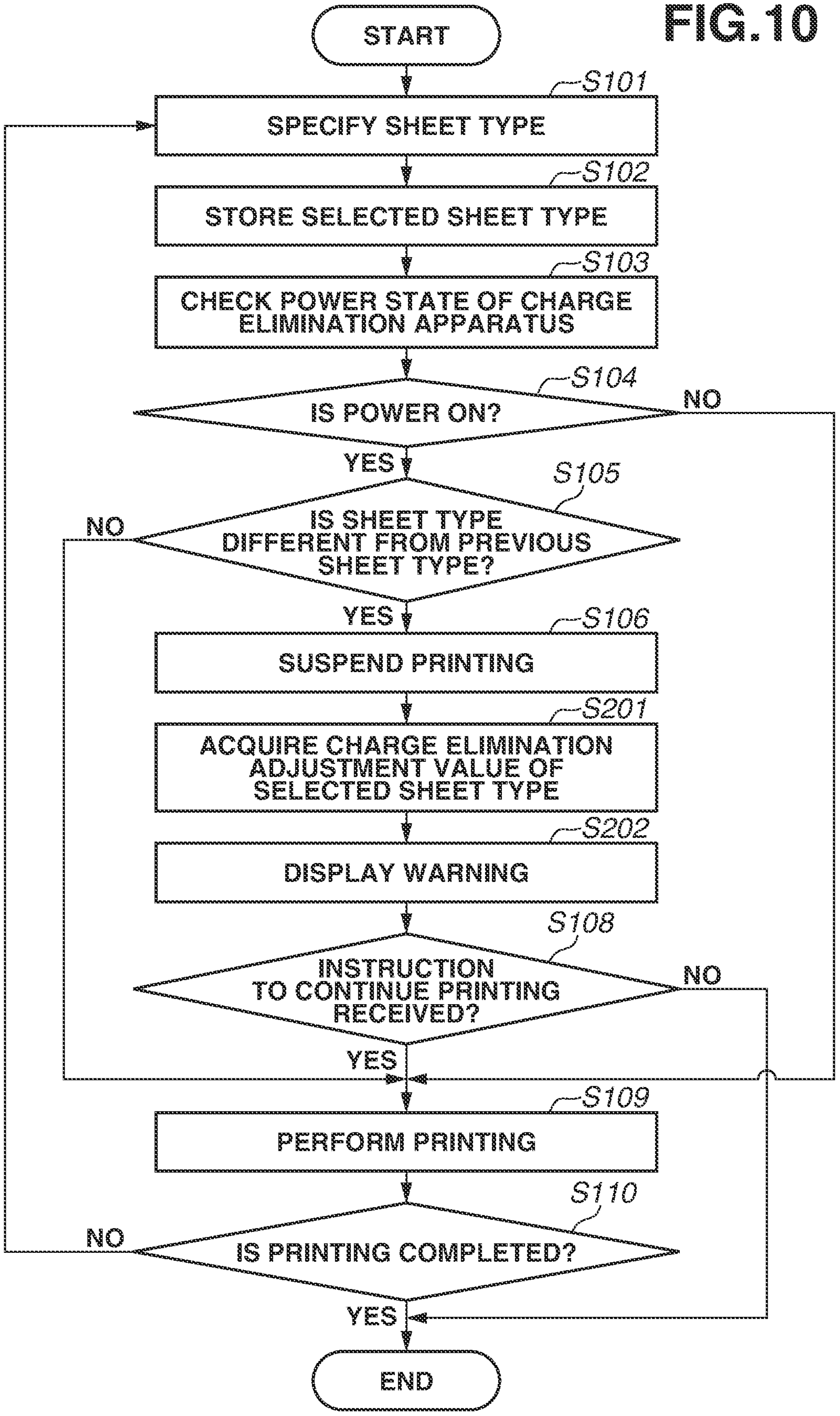
FIG. 10 is a flowchart illustrating a printing process according to a second exemplary embodiment.

FIG. 10 is a flowchart illustrating a printing process according to the second exemplary embodiment. The process described with this flowchart is realized by the control unit 205 loading a program stored in the ROM 207, the HDD 209, or the like to the RAM 208 and executing the program. This process is performed in response to a print job being input to the printing system 1000. In FIG. 10, the same steps as those in FIG. 9 are denoted by the same step numbers. Hereinafter, description of the same steps will be omitted, and only the different steps will be described.

In the second exemplary embodiment, after step S106, the processing proceeds to step S201.

In step S201, the control unit 205 of the printing apparatus 100 acquires a charge-elimination charge adjustment value that matches the sheet type stored in step S102 from a charge adjustment value table illustrated in FIG. 14 stored in advance in the HDD 209.

FIG. 14 is a diagram illustrating an example of the charge adjustment value table according to the second exemplary embodiment.

As illustrated in FIG. 14, the charge adjustment value table stores charge-elimination charge adjustment values, each of which corresponds to a different one of various kinds of sheet types. The charge adjustment value table is stored in the HDD 209, for example.

Figure 13:
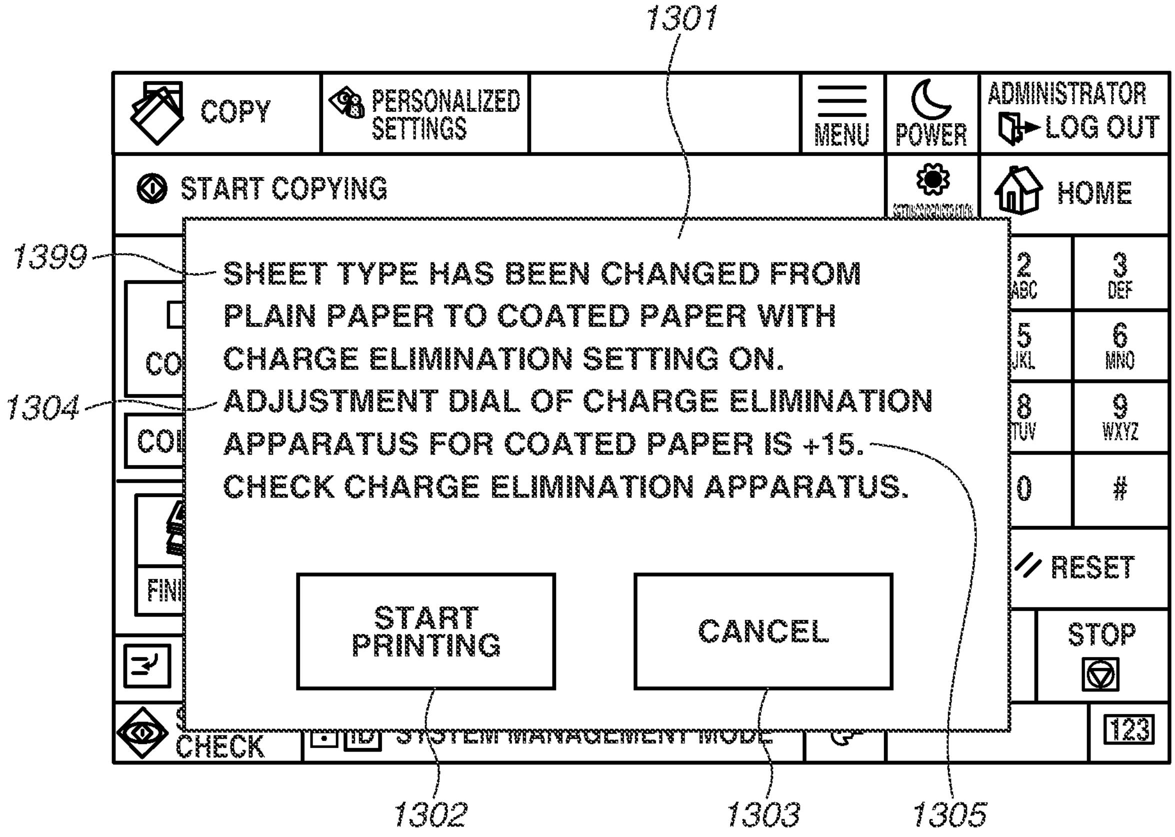
FIG. 13 is a diagram illustrating an example of a print start check screen according to the second exemplary embodiment.

Next, in step S202, the control unit 205 of the printing apparatus 100 displays a print start check screen 1301 as illustrated in FIG. 13 on the operation unit of the printing apparatus 100 and asks the user whether to start printing.

FIG. 13 illustrates an example of the print start check screen 1301 according to the second exemplary embodiment.

On the print start check screen 1301, the control unit 205 of the printing apparatus 100 displays, as indicated by a message 1304, the current sheet type stored in step S102 to the user, in addition to the notification contents which are a message 1399, a print start button 1302, and a cancel button 1303, as illustrated in FIG. 12.

Further, the control unit 205 of the printing apparatus 100 displays, as indicated by information 1305, a charge-elimination charge adjustment value that matches the sheet type acquired in step S201.

In a case where the user wishes to continue the printing after checking or in a case where the user instructs to continue the printing after changing the setting of the charge elimination apparatus, the user presses the print start button 1302. In a case where the user wishes to cancel the printing, the user presses the cancel button 1303. By using this screen, the printing system 1000 prompts the user to check whether the setting of the charge elimination apparatus matches the sheet type, and allows the user to change the setting of the charge elimination apparatus as needed.

After step S202, the processing proceeds to step S108.

By controlling the printing system 1000 including the charge elimination apparatus **200-3*a*** in the above-described way, in displaying of the warning which prompts the user to check the charge-elimination charge adjustment value, the user can easily determine whether the current charge-elimination charge adjustment value is correct.

In the first exemplary embodiment, in a case where the current sheet type is different from the previous sheet type, the printing is suspended, and a warning to prompt the user to check the charge-elimination charge adjustment value is displayed. In the first exemplary embodiment, even in a case of a sheet that does not pass through the charge elimination apparatus, the warning to prompt the user to check the charge-elimination charge adjustment value may be displayed. Thus, in a third exemplary embodiment, in a case of a sheet that does not pass through the charge elimination apparatus, the warning to prompt the user to check the charge-elimination charge adjustment value is not displayed.

Figure 8:
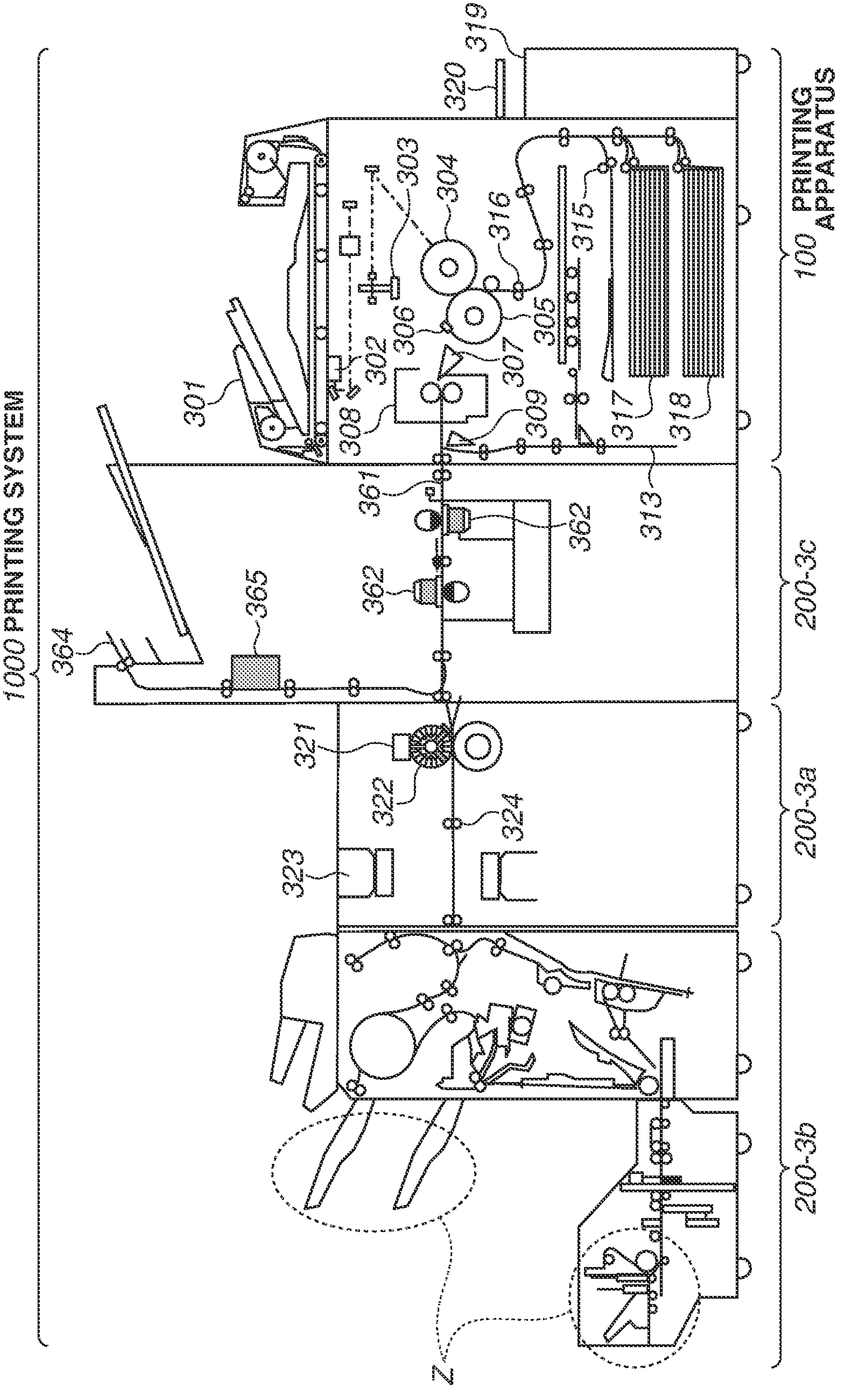
FIG. 8 is a diagram illustrating an example of a cross section of a printing system according to a third exemplary embodiment.

FIG. 8 is a diagram illustrating an example of a cross section of a printing apparatus 100 and a sheet processing apparatus 200 connected to the printing apparatus 100 according to the third exemplary embodiment.

The sheet processing apparatus 200 of the present exemplary embodiment includes a charge elimination apparatus 200-3*a*, an adjustment apparatus 200-3*c*, and a saddle stitch bookbinding machine 200-3*b*. The sheet processing apparatus 200 according to the present exemplary embodiment is the same as that in FIG. 3, except that the adjustment apparatus 200-3*c* is disposed between the printing apparatus 100 and the charge elimination apparatus 200-3*a*, and thus, redundant descriptions of the printing apparatus 100 and the saddle stitch bookbinding machine 200-3*b* will be omitted.

As illustrated in FIG. 8, a paper detection sensor 361 in the adjustment apparatus 200-3*c* detects a sheet that travels along a sheet conveyance path. The sheet conveyance path includes a paper conveyance belt in black. The use of the paper conveyance belt in black helps the paper detection sensor 361 to capture the paper edge of a white printed material travelling along the sheet conveyance path and to detect the presence or absence of the printed material. The paper detection sensor 361 includes a plurality of sensors disposed in a direction perpendicular to the paper conveyance direction, and the sensors detect the presence or absence of a printed material at the respective positions to obtain paper passage times.

Based on information about a change in the presence or absence of a printed material and the passage times of the leading edge of the printed material sent from each paper detection sensor 361, the adjustment apparatus 200-3*c* calculates a skew angle of the printed material from the conveyance speed of the paper conveyance belt. Next, by using a signal indicating the detection of the presence or absence of a sheet as a trigger, the adjustment apparatus 200-3*c* reads image data of the printed material by controlling contact image sensors (CISs) 362.

Two CISs 362 are disposed such that one is above the sheet conveyance path and the other is below the sheet conveyance path, so that the front and back sides of the printed material can be read.

The adjustment apparatus 200-3*c* uses the image data read by the CISs 362 to perform color measurement of an image-adjustment chart image formed on a printed material, and performs image adjustment, such as density correction and front-and-back registration correction.

The adjustment apparatus 200-3*c* has a purge function of discharging a defective printed material to an output tray 364 in accordance with an instruction from, or the circumstances of, the printing apparatus 100 and the adjustment apparatus 200-3*c*.

The adjustment apparatus 200-3*c* also has a color sensor 365 on a conveyance path to the output tray 364. The adjustment apparatus 200-3*c* uses the image data read by the color sensor 365 to perform color measurement of an image-adjustment chart image for density unevenness correction formed on a printed material, and corrects the density unevenness.

With a discharge setting in which the output tray 364 is specified as the destination of the discharged paper (discharge destination), the printed sheet does not pass through the charge elimination apparatus 200-3*a*. Thus, in a case where the discharge setting is set, the warning for requesting the user to check the charge-elimination charge adjustment value is not displayed.

Figure 11:
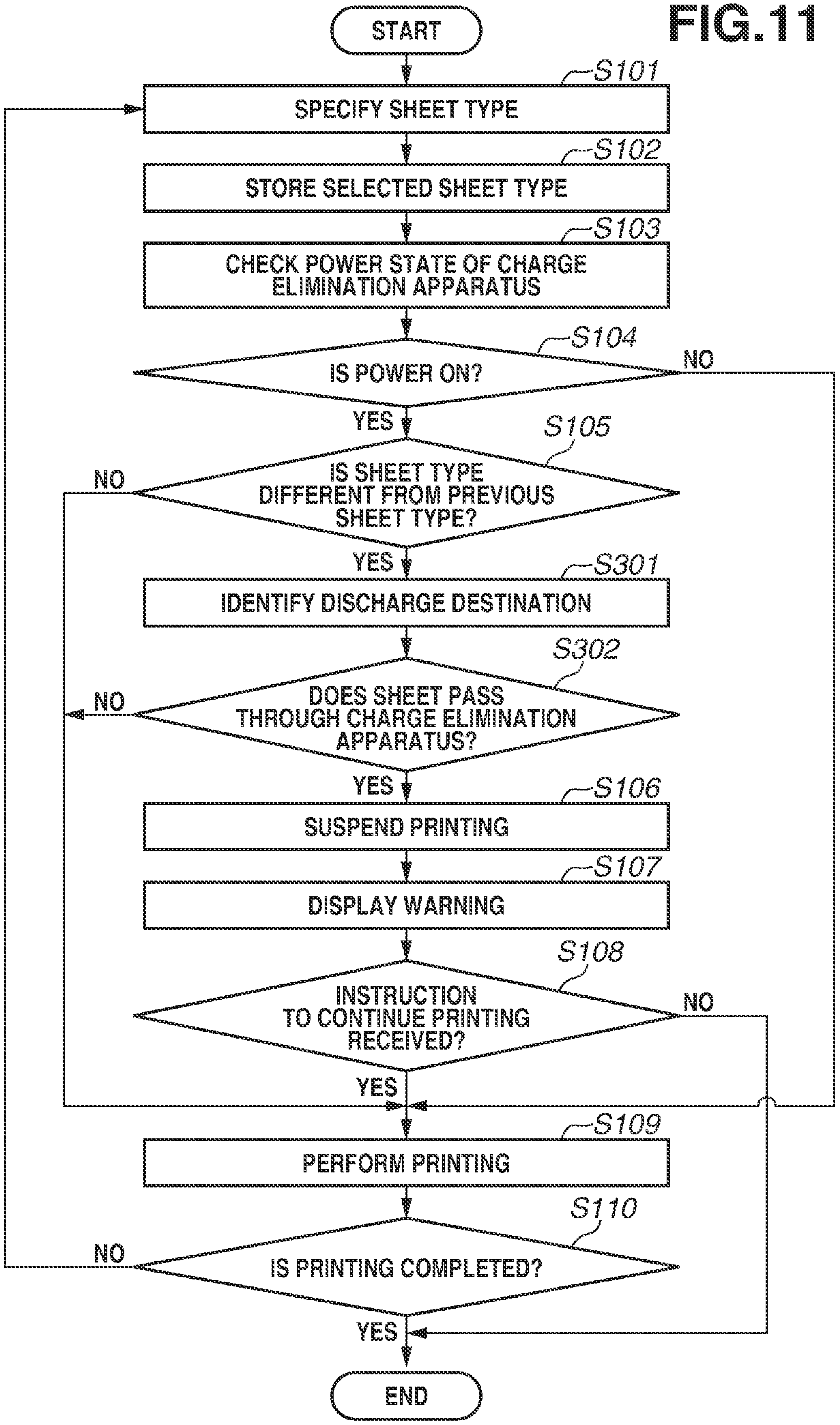
FIG. 11 is a flowchart illustrating a printing process according to the third exemplary embodiment.

FIG. 11 is a flowchart illustrating a printing process according to the third exemplary embodiment. The process described by this flowchart is realized by the control unit 205 loading a program stored in the ROM 207, the HDD 209, or the like to the RAM 208 and executing the program. This process is performed in response to a print job being input to the printing system 1000. In FIG. 11, the same steps as those in FIG. 9 are denoted by the same step numbers. Redundant descriptions of the same steps will be omitted, and only the different steps will be described.

In the third exemplary embodiment, after step S105, the processing proceeds to step S301.

In step S301, the control unit 205 of the printing apparatus 100 interprets the setting of the received print job and identifies the discharge destination of the sheet. In the configuration of the printing system 1000 according to the third exemplary embodiment, in a case where the adjustment apparatus 200-3*c* performs density unevenness correction using the image-adjustment chart image, the discharge destination of the sheet is the output tray 364 of the adjustment apparatus 200-3*c*.

Next, in step S302, the control unit 205 of the printing apparatus 100 checks whether the discharge destination identified in step S301 is a discharge destination with a route passing through the charge elimination apparatus 200-3*a*. Although not illustrated, information about whether each individual discharge destination is a destination with a route passing through the adjustment apparatus 200-3*c* is stored in advance in the HDD 209. In the case of the configuration example of the printing system 1000 according to the present exemplary embodiment, only when the sheet is discharged to the output tray 364 of the adjustment apparatus 200-3*c* does the sheet not pass through the charge elimination apparatus 200-3*a*.

In step S302, in a case where the control unit 205 of the printing apparatus 100 determines that the sheet passes through the charge elimination apparatus 200-3*a* (YES in step S302), the processing proceeds to step S106.

In a case where the control unit 205 of the printing apparatus 100 determines that the sheet does not pass through the charge elimination apparatus 200-3*a* (NO in step S302), the control unit 205 of the printing apparatus 100 determines that there is no problem in continuing the printing process without any change, and the processing proceeds to step S109. That is, in this case, the control unit 205 of the printing apparatus 100 does not display the warning to prompt the user to check the charge-elimination charge adjustment value.

As described above, even with the charge elimination function being enabled and with the sheet type having been changed during the printing process, in a case where a discharge destination with a route not passing through a predetermined conveyance path (a path on which the charge elimination apparatus performs charge elimination on the sheet) is set in the printing process, the following control is performed. That is, the printing system 1000 including the charge elimination apparatus 200-3*a* is controlled not to suspend the printing process. In this way, in a case where the sheet does not pass through the charge elimination apparatus, display of the warning to prompt the user to check the charge-elimination charge adjustment value can be skipped.

The above exemplary embodiment has been described based on an example in which the sheet type has been changed during a print job. However, some embodiments of the present disclosure are not limited to this example. The present disclosure is also applicable to a case where the sheet type is changed between print jobs.

That is, in a case where the sheet type is changed with the charge elimination function being enabled in a period after the end of the previous printing process and before the start of the next printing process, the control unit 205 of the printing apparatus 100 restricts the start of the next printing process.

Further, in a case where the start of the next printing process is restricted, the control unit 205 of the printing apparatus 100 displays a message to prompt the user to check the setting value of the quantity of charges to be eliminated by the charge elimination function and displays information (a warning) for instructing the user to start the next printing process or to cancel the next printing process. In response to the user instructing the start of the next printing process, the control unit 205 of the printing apparatus 100 cancels the restriction.

According to the exemplary embodiments described above, the charge elimination can be performed with an appropriate charge quantity matching the sheet type. This leads to a reduction in the occurrence of a situation in which, for example, the sheet type has been changed during the printing process and the charges on the sheet are eliminated with an inappropriate charge elimination setting. That is, the risk that the charge elimination control operation is performed with a charge adjustment value inappropriate for the target sheet can be reduced.

Various kinds of data described above are not limited to the configurations and contents described above. It goes without saying that the data may have various kinds of configurations and contents, depending on the application or purpose.

While the present disclosure has described exemplary embodiments, some embodiments of the present disclosure may be embodied as a system, an apparatus, a method, a program, a storage medium, etc. Specifically, the present disclosure may be applied to a system including a plurality of devices or may be applied to a single device.

Any configurations obtained by combining the above-described exemplary embodiments are also included in the present disclosure.

Other Embodiments

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-031381, which was filed on Mar. 1, 2023 and which is hereby incorporated by reference herein in its entirety.

What is claimed is:

1. A printing system comprising:

a charge elimination unit that performs a charge elimination process on a sheet;

a printer unit configured to perform a printing process;

a control unit configured to perform, in a case where a sheet type to be used for the printing process has been changed during the printing process, control to stop the printing process;

a first operation unit configured to change a setting of charge elimination that is performed by the charge elimination unit; and a display configured to display, on condition that a sheet type to be used for the printing process has been changed during the printing process, information for prompting a user to check the setting of charge elimination that is performed by the charge elimination unit.

2. The printing system according to claim 1, further comprising a storage device configured to store, on a sheet type basis, the setting of charge elimination that is performed by the charge elimination unit, wherein the display further displays a setting value of charge elimination that is performed by the charge elimination unit, the setting value matching a changed sheet type.

3. The printing system according to claim 1, wherein the charge elimination unit performs charge elimination on a sheet that passes through a predetermined conveyance path, and wherein, even when the sheet type has been changed during the printing process performed by the printer unit, in a case where a discharge destination with a route not passing through the predetermined conveyance path is set in the printing process, the control unit does not stop the printing process.

4. The printing system according to claim 1, further comprising a second operation unit configured to receive a restart instruction for restarting of the printing process after the printing process is stopped, wherein the control unit restarts the printing process in response to the second operation unit receiving the restart instruction.

5. The printing system according to claim 1, further comprising a second operation unit configured to receive an instruction for canceling of the printing process after the printing process is stopped, wherein the control unit cancels the printing process in response to the second operation unit receiving the cancel instruction.

6. A control method for a printing system including a charge elimination unit that performs a charge elimination process on a sheet, the control method comprising:

performing a printing process;

performing, in a case where a sheet type to be used for the printing process has been changed during the printing process, control to stop the printing process;

changing a setting of charge elimination that is performed by the charge elimination unit; and displaying, on condition that a sheet type to be used for the printing process has been changed during the printing process, information for prompting a user to check the setting of charge elimination that is performed by the charge elimination unit.

7. A non-transitory computer-readable storage medium storing a program that causes a computer to perform a control method for a printing system including a charge elimination unit that performs a charge elimination process on a sheet, the control method comprising:

performing a printing process;

performing, in a case where a sheet type to be used for the printing process has been changed during the printing process, control to stop the printing process;

changing a setting of charge elimination that is performed by the charge elimination unit; and displaying, on condition that a sheet type to be used for the printing process has been changed during the printing process, information for prompting a user to check the setting of charge elimination that is performed by the charge elimination unit.

* * * * *